United States Patent
Pyon

[11] Patent Number: 6,021,746
[45] Date of Patent: Feb. 8, 2000

[54] ARC-PISTON ENGINE

[76] Inventor: Sang-Bok Pyon, 101-605 Hyundai Apt. Hagye-dong, Nowon-gu, Seoul, Rep. of Korea

[21] Appl. No.: 09/046,905

[22] Filed: Mar. 24, 1998

Related U.S. Application Data

[63] Continuation-in-part of application No. 08/579,950, Dec. 28, 1995, Pat. No. 5,970,924.

[30]       Foreign Application Priority Data

Jun. 29, 1995  [KR]  Rep. of Korea ...................... 95-17971

[51] Int. Cl.⁷ .................................................. F02B 53/06
[52] U.S. Cl. ........................................ 123/18 A; 60/605.1
[58] Field of Search ................................. 123/18 R, 18 A; 60/605.1

[56]                References Cited

U.S. PATENT DOCUMENTS

| 736,151 | 8/1903 | Primat | 123/18 A |
|---|---|---|---|
| 1,113,262 | 10/1914 | Twombly | 123/18 R |
| 1,352,127 | 9/1920 | Henderson | 123/18 A |
| 1,473,199 | 11/1923 | Peraza | 123/18 R |
| 1,529,352 | 3/1925 | Hagberg et al. | 123/18 R |
| 1,940,788 | 12/1933 | Davis | 123/18 R |
| 2,154,315 | 4/1939 | Moraway | 123/18 A |
| 2,387,467 | 10/1945 | Reiter | 123/18 A |
| 3,543,510 | 12/1970 | Kaufmann | 60/380 |

FOREIGN PATENT DOCUMENTS

| 18513 | 2/1914 | Denmark | 123/18 R |
|---|---|---|---|
| 2253563 | 11/1972 | Germany . | |
| 2639450 | 3/1978 | Germany | 123/18 R |
| 3447004 | 2/1987 | Germany . | |
| 3128309 | 5/1994 | Germany . | |
| 564265 | 6/1957 | Italy | 123/18 R |
| 60-22027 | 2/1985 | Japan | 123/18 A |

*Primary Examiner*—Michael Koczo
*Attorney, Agent, or Firm*—Merchant & Gould P.C.

[57]                ABSTRACT

An engine having an annular cylinder formed about an opening which utilizes an arc-piston reciprocally positioned in the annular cylinder with a partition secured within the annular cylinder separating the annular cylinder into an air intake compression chamber and a gas combustion chamber such that in use upon reciprocation of the arc-piston one of the chambers is expanding while the remaining of the chambers is contacting is disclosed. Within the opening a conventional gas turbine may be positioned and the rotational power of the arc-piston engine is combined with the rotational power of the gas turbine.

4 Claims, 10 Drawing Sheets

6,021,746

ARC-PISTON ENGINE

This application is a Continuation-in-Part of application Ser. No. 08/579,950 filed Dec. 28, 1995, U.S. Pat. No. 5,970,924.

BACKGROUND OF INVENTION

FIELD OF THE INVENTION

This invention relates to an arc piston engine and more specifically to an arc piston drive engine having an output which is enhanced by a turbine engine positioned within the annular cylinder engine block housing the arc piston.

SUMMARY OF THE INVENTION

The present invention comprises a combined turbine annular piston engine. In either a two-cycle or a four-cycle engine, an arc piston reciprocating along an arc path within the annular cylinder 1 is converted to rotational output of the flywheel 11 via the connecting rod 13 as a crank unit. A radial gas turbine 15 is positioned in the opening in the middle of the annular cylinder. A power enhancing unit is connected to the output shaft 10 of the arc-piston 7 engine or to the gas-turbine shaft 17. As a result, the turbo enhanced annular piston engine has substantially improved heat efficiency.

Advantages of the present invention include reduced weight and volume of the cylinder per horse power. In addition, the arc-piston stroke is longer than that of conventional piston engines since the cylinder is arc-shaped. This results in perfect combustion of the fuel/air mixture because of the increase in air-charging efficiency. Therefore, exhaust pollution is substantially reduced, engine height is lowered, and fuel efficiency is much improved because of an increase in output power. In addition, production cost is reduced because of the simple structure, and safety and durability are excellent as well.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1:
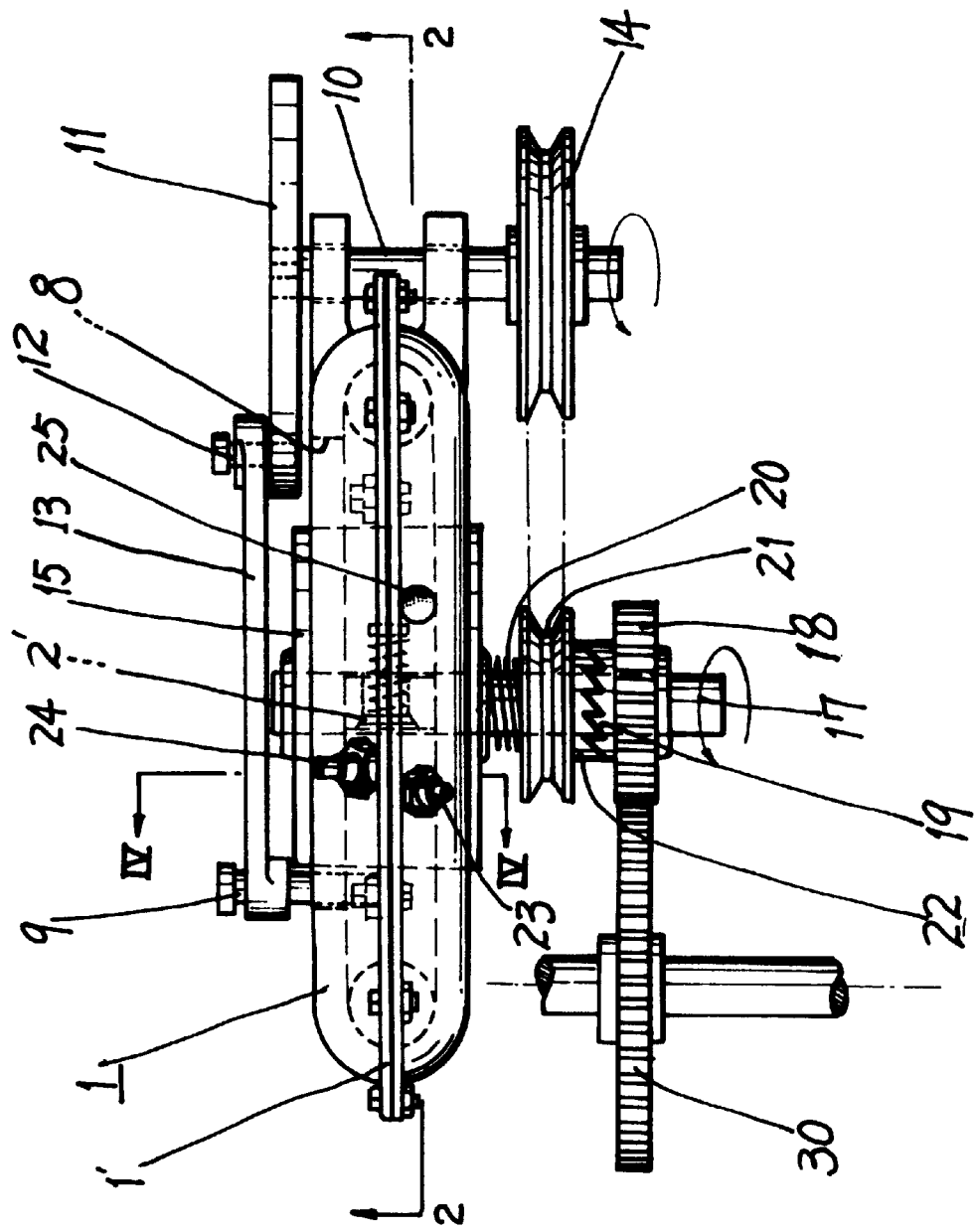
FIG. 1 is a schematic plan view showing a two-cycle engine of the annular cylinder type according to the present invention.

The present invention is related to a turbo enhanced annular cylinder engine. In this engine, the mixture of air and fuel or air only is taken into the annular cylinder and compressed using an arc-shaped piston (or compressed air is fuel-injected). The mixture or air only is then ignited and burned. The high-temperature, high-pressure combusted gas is applied to the arc piston head, resulting in an arc path reciprocating motion within the annular cylinder. To convert this motion to rotational motion, one end of the connecting rod is connected to the fixing pin of the arc cylinder's middle-side wall, while the other end is connected to the fixing pin of the flywheel. As a result power is generated in the turbo enhanced annular cylinder engine.

In general, a conventional piston engine has disadvantages in that it has a large volume and weight per horsepower, is tall in height, and is low in heat efficiency due to large exhaust loss. If the engine height is designed too low the effective stroke of the piston is reduced, resulting in imperfect combustion followed by dirty exhaust gas.

A primary object of the present invention is to improve the aforementioned problems of the conventional piston engines. That is, the mixture of air and fuel or air only taken into the annular cylinder is compressed using an arc-shaped piston (or compressed air is fuel-injected), and then is ignited and combusted. The high-temperature, high-pressure combusted gas is applied to the arc piston head, resulting in an arc path reciprocating motion within the annular cylinder. To convert this motion to rotational motion one end of the connecting rod is connected to the fixing pin of the arc cylinder's middle-side wall, while the other end is connected to the fixing pin of the flywheel. Power is then obtained. Providing such a turbo enhanced annular cylinder engine is the object of the present invention.

In the present invention air or a mixture of air and fuel is taken into the annular cylinder. After compression by the arc piston (or compressed air is fuel injected) the ignited, combusted and then rapidly expanding high temperature/pressure combustion gas forces the arc piston along the arc path of the annular cylinder and reciprocates therein. To convert this motion into rotational output, one end of the connecting rod is connected to the fixing pin through the arc cylinder's middle-side wall, while the other end is connected to the fixing pin of the flywheel. Heat energy generated within the cylinder is then converted to mechanical energy. The intake/exhaust ports are opened and/or closed using a valve unit driven by the flywheel shaft and the arc piston completes a two-stroke or four-stroke cycle. A conventional radial gas turbine is positioned in the relatively large opening in the middle of the annular cylinder, which has an effect of composing a hybrid engine by combining the velocity-energy cycle of a gas turbine with a volumetric-type, pressure-energy cycle of a two-cycle or four-cycle engine. Therefore, heat efficiency is substantially improved and the effective stroke of the arc piston is increased because of the annular shape of the cylinder, which facilitates a huge amount of air intake resulting in near-perfect combustion and clean exhaust. In addition, high power output reduces weight and volume per horsepower, the engine height is lowered when applied to an automobile, and characteristics such as lubrication, fuel efficiency, durability, safety and the like are all improved.

Figure 2:
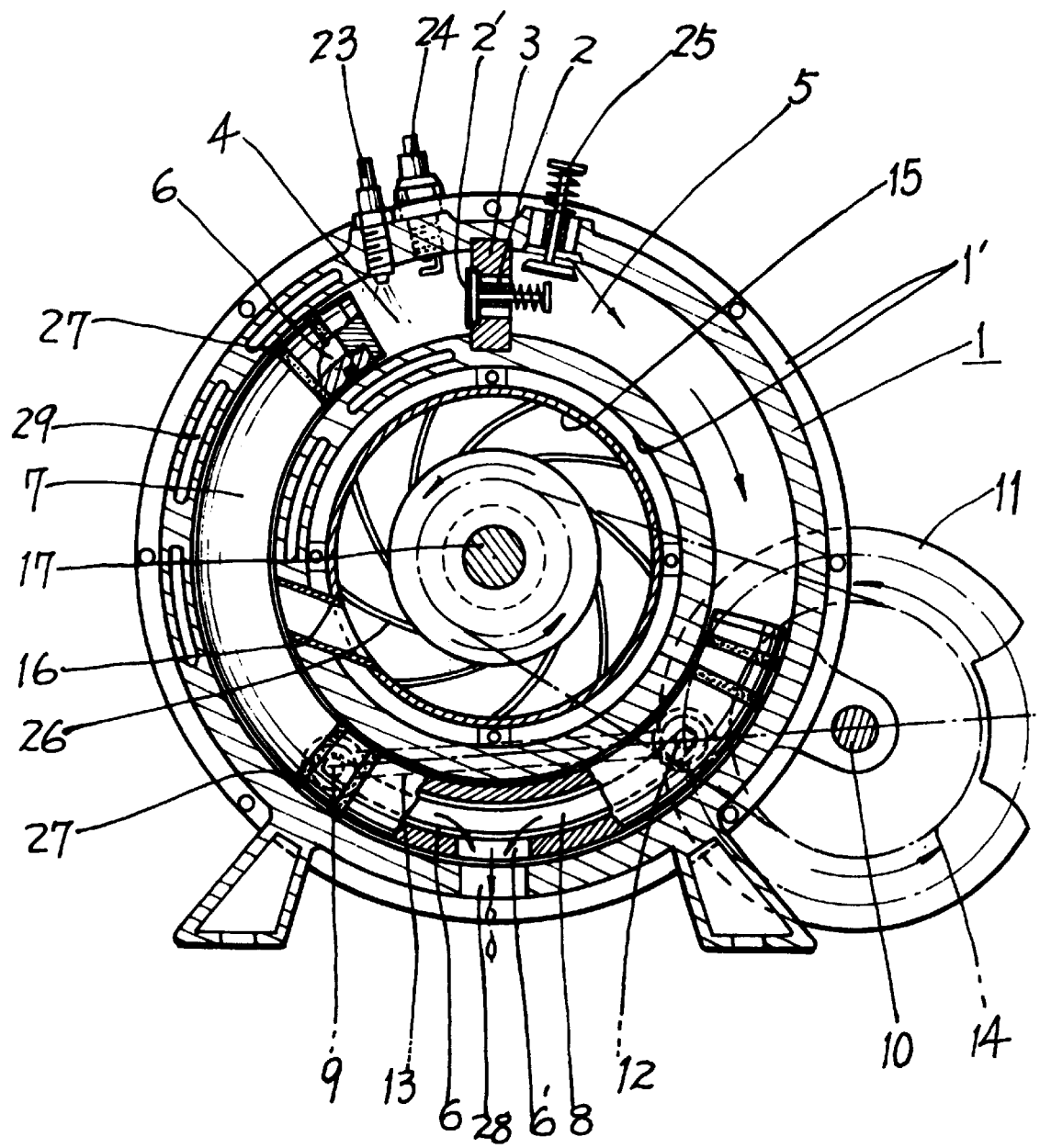
FIG. 2 is a cross-sectional view from line II—II of FIG. 1.
Figure 3:
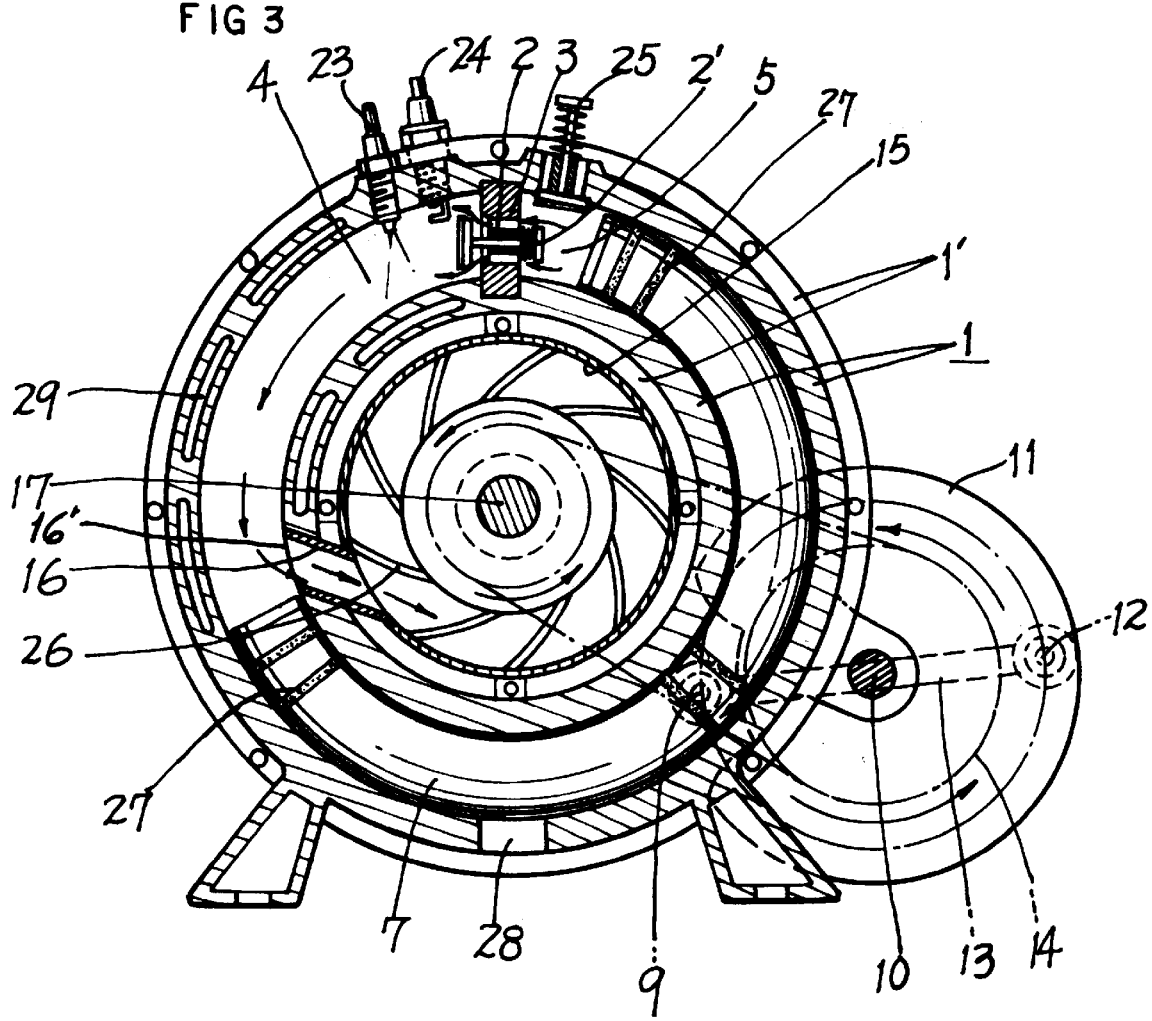
FIG. 3 is a schematic cross-sectional view showing the operational state of FIG. 2.
Figure 4:
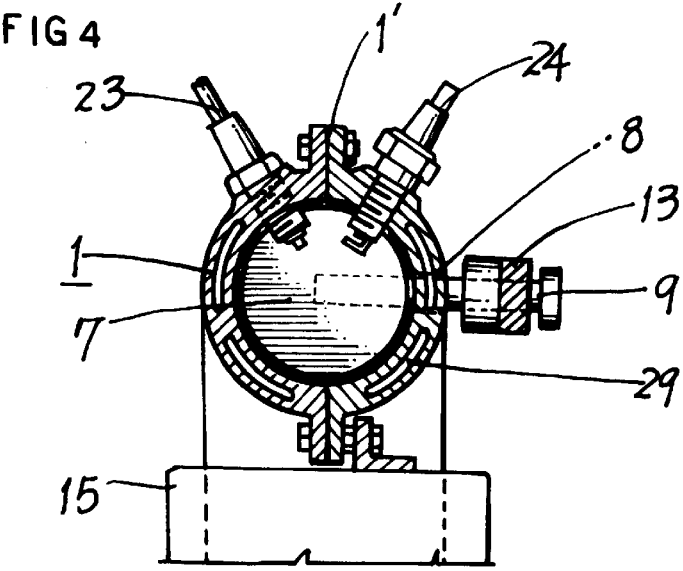
FIG. 4 is a partially-enlarged cross-sectional view from line IV—IV of FIG. 1.

FIG. 1 is a schematic view of the two-cycle engine according to the present invention. FIG. 2 is a cross-sectional view along line V–II of FIG. 1. FIG. 3 is a schematic cross-sectional view showing the operational state of FIG. 2. FIG. 4 is a partially-enlarged, cross-sectional view along line IV—IV of FIG. 1.

The annular cylinder 1 includes partition-type flanges fastened by bolts. A partition 3 equipped with valve 2' in the scavenging port is fixed to the upper-chamber cylinder 1, or valve 2' and scavenging port 2 may be formed in the upper chamber of the cylinder 1 as shown in FIG. 8. The gas combustion chamber 4 and an air intake/compression chamber 5 are separately formed on the left and right sides of the partition 3, respectively. The fuel injector 23 and an ignition plug 24 are positioned in the gas combustion chamber 4, while the air intake valve 25 is positioned in the side wall of the air intake/compression chamber 5. The lubricating oil drain 6 and the lubricating oil passage 6' are installed in the centerline of the arc piston 7 inserted to the annular cylinder. For arc path reciprocating motion of the arc piston 7, the fixing pin 9 at the middle-side wall of the cylinder 1 extends through the arc-type guide port 8 formed in the side wall. The pin is connected to one end of the external connecting rod 13 and the other end of the connecting rod is connected to the fixing pin 12 of the flywheel 11 of the output shaft 10. In the opening of the annular cylinder 1 the conventional radial gas turbine 15 is positioned, for example, by using a number of bolts to secure it to flange 1' of the cylinder 1 as shown in the cross-sectional views of FIGS. 4 and 7. The exhaust pipe 16 is operatively connected to the impeller 26 of the gas turbine 15. The exhaust port is positioned around the lower dead point of the arc piston 7 within the annular cylinder 1 as shown in FIG. 3. The main wheel 14 is secured to one end of the output shaft 10 and the flywheel 11 is secured at the opposite end of the output shaft. Over-running clutch 22, which is located in the side wall of the driven wheel 21, rotates about the gas turbine shaft 17 and is exerted by the thrust force of spring 20, and is engaged with the clutch 19 in the side wall of the driving gear 18 at the end of the gas turbine shaft 17, as seen in FIG. 1. The fuel injector 23 and the ignition plug 25 are operatively installed in the gas combustion chamber. In the inner wall of the air intake/compression chamber 5 on the right side, an automatic air intake valve 25 is installed, and a conventional valve opening/closing unit with the rocker arm 52 shown in FIG. 8, can be installed as well if needed.

The operation of the aforementioned two-cycle engine can be described with reference to FIGS. 1, 2 and 3 as follows. When the left-side head of the arc-path reciprocating arc piston 7 starts the air-compressing stroke, the right-side head performs an air-intake stroke. Thus, air intake valve 25 is automatically opened and the valve 2' of the scavenging port 2 installed in the partition 3 is automatically closed. When the arc piston 7 compresses the air until it reaches the upper dead point of the stroke in the combustion chamber 4, the fuel injector 23 and the ignition plug 24 are operatively initiated, causing the combustion of low-quality, oil-like gasoline, and then a high-temperature, high-pressure combustion gas is generated, the force of which is applied to the arc piston 7 head to begin the power stroke. The exhaust port 16' opens as the power-stroking arc piston 7 head reaches the lower dead point of its stroke in the combustion chamber 4. The exhaust therein is directly forced from the very short exhaust pipe 16 against the impeller 26 of the radial gas turbine 15 without any cooling process as in the exhaust manifold of the conventional engine. Collection efficiency of the exhaust gas energy is thus high. As a result, the high discharge velocity of the exhaust gas enables the gas turbine shaft 17 to rotate at high speed in the direction indicated by the arrow (FIG. 2). When the engine continues to operate in this manner, the exhaust energy flows to the turbine 15 and drives the impeller 26 by the blow-down method, which reduces the conventional exhaust loss. This improves the heat efficiency of the engine in the present invention.

Since the pressure within the combustion chamber 4 starts to decrease rapidly when the exhaust is discharged through the exhaust port 16', the pressure difference between the compressed air in the air intake/compression chamber 5 and the gas in the combustion chamber 4 causes the scavenging-port valve 2' to open. Then the compressed air is rapidly discharged into the combustion chamber which scavenges through the exhaust pipe 16 and thus only clean air is left within the cylinder 1. The fixing pin 9 set in the middle-side wall of the arc piston 7 passes through the outside so that it slides along the arc-shaped guide port 8 formed in the side wall of the cylinder 1. The connecting rod 13 is attached at one end to the fixing pin 9. The fixing pin of the flywheel 11 is attached to the other end of the connecting rod 13. This assembly converts the arc path reciprocating motion of the arc piston 7 within the annular cylinder 1 to rotate the output shaft 10. Hence, a crank shaft, which is required in the conventional piston engine, is not used. The compression stroke occurs in the gascombustion chamber on the left side of the arc piston 7, while the air intake valve 25 automatically opens and, at the same time, the air-intake stroke takes place in the air intake/compression chamber 5 on the right side.

In order to combine the power of the arc-piston 7 engine with the power of the radial gas turbine 15, the main wheel 14 is rotatably secured to the output shaft 10 and the driving gear 18, formed with clutch 19, is secured to the gas-turbine shaft 17 as shown in FIG. 1. The over-running clutch 22 of the driven wheel 21, which rotate freely about shaft 17, adds the rotational power of the output shaft 10 when the spring 20 forces it to engage clutch 19. The power of the gas turbine 15 is then substantially increased since the power of the main wheel 14 is additionally transmitted to the driving gear 18 by a V belt, for example.

As described above, the hybrid engine suggested by the present invention has an increased total heat efficiency of 50–60% and has better performance when compared with a conventional piston engine (heat efficiency of 30–40%) since the individual cycles of the arc-piston 7 engine and the gas-turbine 15 engine are combined. This improved performance may be due to the fact that the scavenging air flow is sequential in the direction of the exhaust discharge and thus the scavenging action is reliable without the exhaust mixing with the clean air. Further, since the arc-piston 7 stroke is rather long in the air intake/compression chamber 5 on the right and the arc piston 7 on the left moves down from the upper dead point of the combustion chamber 4 within the annular cylinder 1, time needed for complete and efficient gas combustion is available.

The long arc-piston 7 stroke in the air intake/compression chamber 5 of the present invention allows for the intake of a huge amount of air. The air compressed by the right-side head of the arc piston 7 passes through the scavenging port 2 and flows into the combustion chamber 4 on the left at high pressure. This results in the smooth discharge of the exhaust gas, a high air-charge rate, and maximization of gas-combustion efficiency which substantially decreases discharge of harmful substances such as carbon monoxide and unburnt hydrocarbons. Moreover, connecting a conventional super charger to the gas-turbine shaft 17 ensures a supply of high-density air to the air-intake valve 25, and thus the air-charge efficiency and engine output power would be substantially increased.

Lubricating oil, whose mixing ratio is 15:1, 20:1 when fuel-injected and collected by the oil ring 27 of the arc piston 7 to flow along the lubricating-oil passage 6 on the piston centerline, passes through the lubricating-oil drain 6' and the lubricating-oil inlet 28 prepared in the annular cylinder 1, and then drops into the conventional oil sump 49, as shown in FIG. 8.

As shown in FIG. 8, cutting a bottom portion of the annular cylinder 1 and forming a U-shaped cylinder provides a cooling effect, and the entire lubricating-oil inlet and the partial guide port may not be used.

Figure 7:
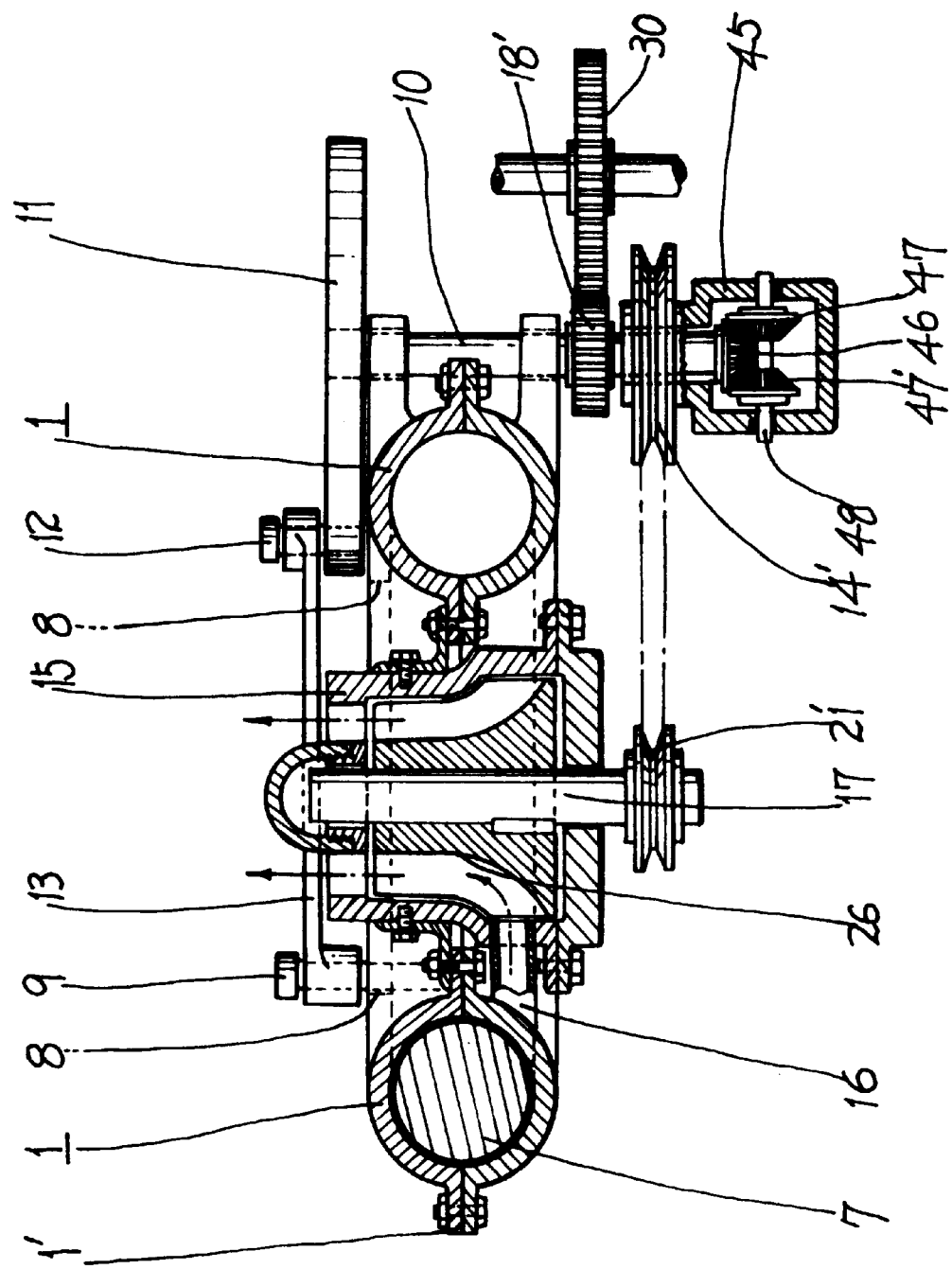
FIG. 7 is a plan cross-sectional view showing another application example of the double dynamic compound mechanism.
Figure 8:
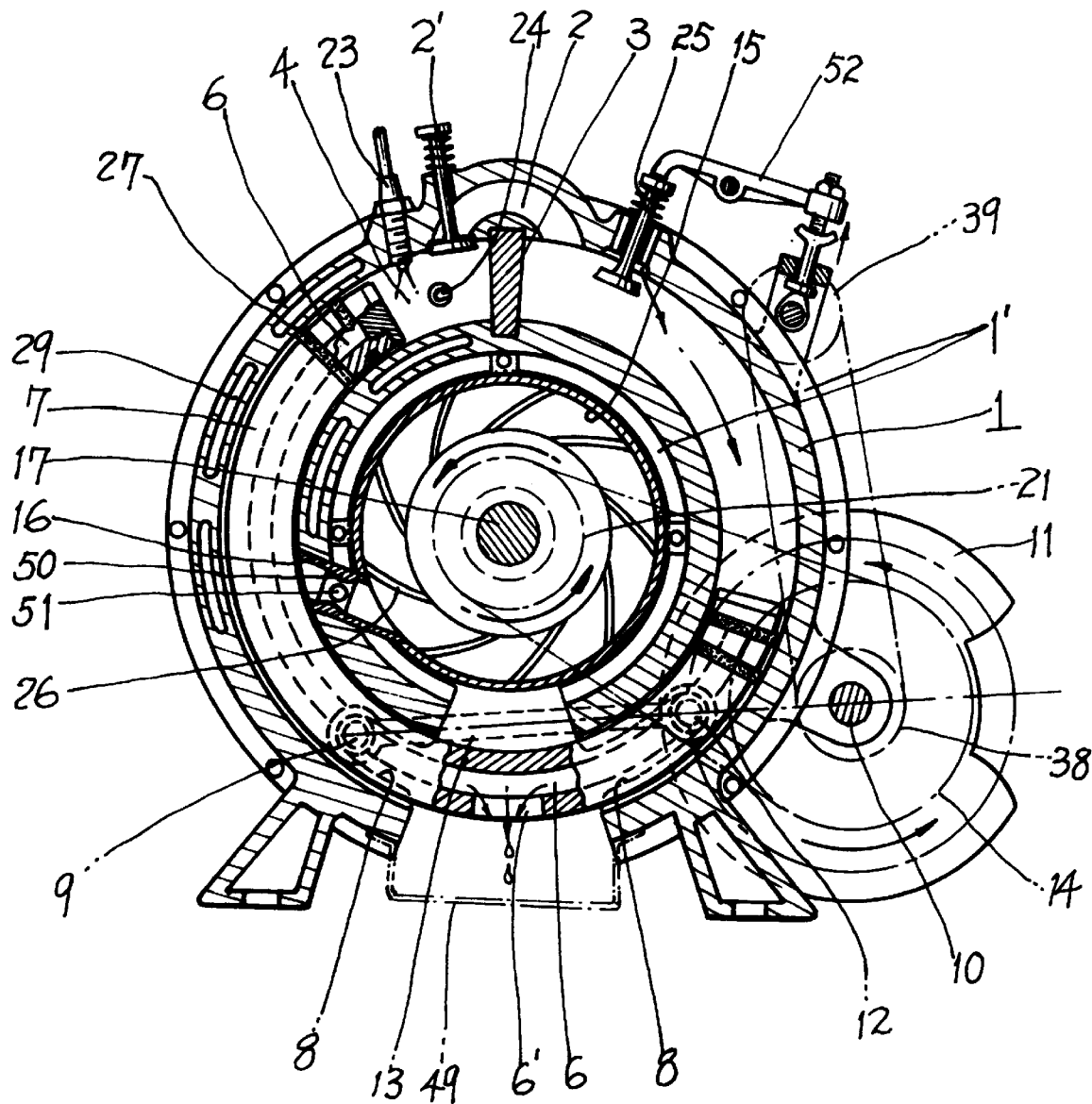
FIG. 8 is a schematic cross-sectional view showing another application example of the scavenging port/valve, the exhaust pipe and the annular cylinder.

FIG. 7 illustrates a plan cross-sectional view of another application example of the enhanced output power of the combined gas turbine and the arc-piston engine. In order to combine the two rotational outputs having different rates of rotation, one for the gas-turbine shaft 17 and the other for the output shaft 10 of the arc-piston 7 engine, the main wheel 21' is fixed to the turbine shaft 17 and a differential bevel gear unit 45 is connected to passive wheel 14' which is rotatably secured to the flywheel shaft 10 of the arc-piston 7 engine. The side gears 47, 47' are supported by and rotate about spindle shaft 48 which is fixed to the differential bevel gear unit 45, and are rotatably driven by the pinion 46 fixed to the output shaft 10.

These side gears increase the total rotational output power by additionally transmitting the rotational power of the turbine shaft 17 to the output shaft 10. Assuming that the rate of rotation of the gas-turbine shaft 17 is identical to that of the engine output shaft 10, the side gears do not work and rotate as a single body being mated with the pinion 46. A difference in the rate of rotation, however, results in the differential motion of the side gears 47, 47'. That is, if the differential bevel gear unit 45 rotates faster than the engine output shaft 10, then the side gears 47, 47' move around on the pinion 46 and automatically rotate about the spindle 48.

Described above is a two-stroke cycle engine, one cycle of which is completed with two strokes of the piston (one rotation of the flywheel shaft) by combining the intake and compression strokes with the power and exhaust strokes, respectively.

Described below is the structure and operation state of a four-stroke (inlet, compression, power (explosion) and exhaust strokes) cycle engine related to the present invention. Repeated explanation for the parts shown also in the drawing figures of the two-stroke cycle engine is avoided for sake of brevity.

Figure 5:
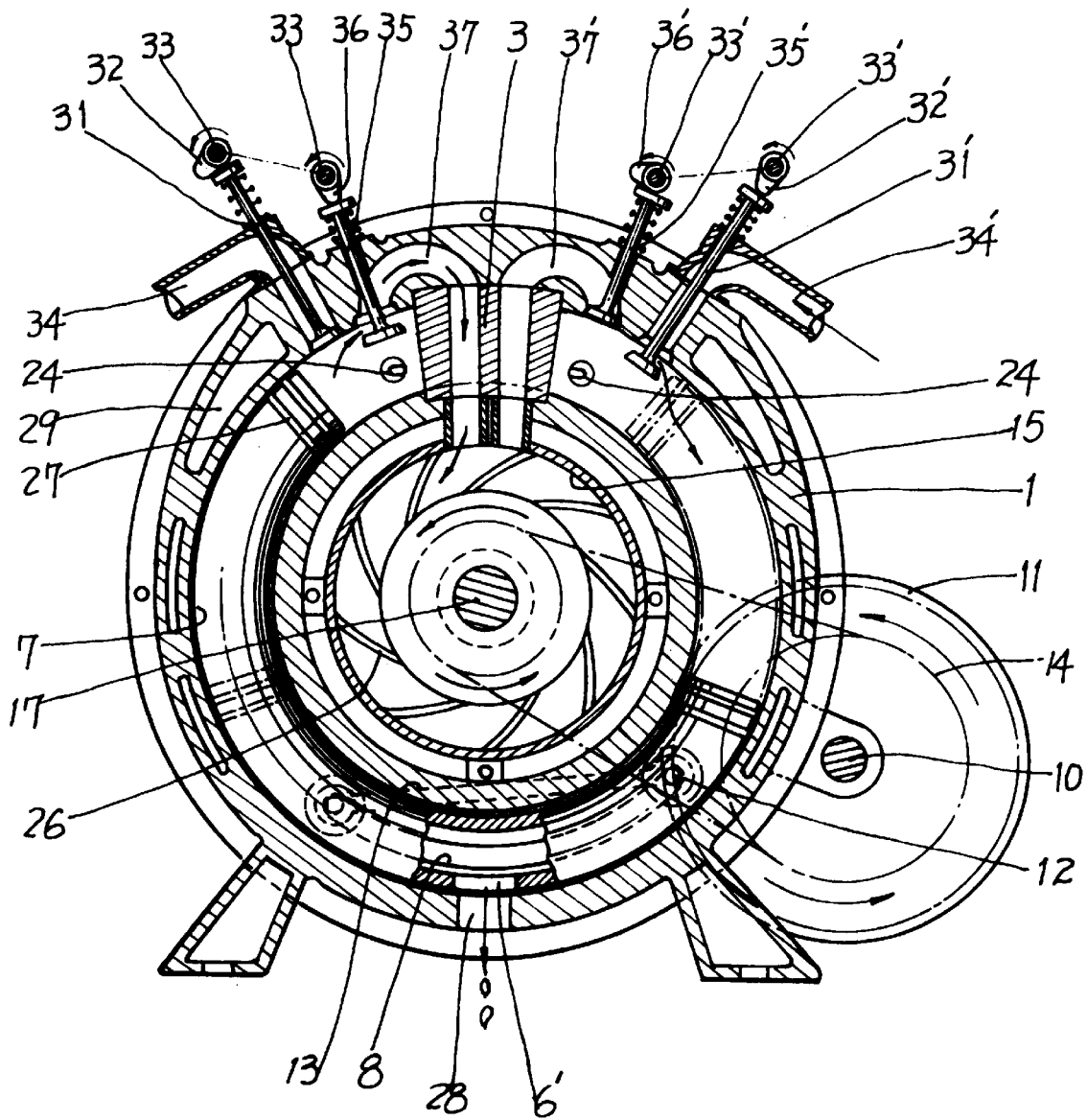
FIG. 5 is a schematic cross-sectional view showing a four-cycle annular cylinder engine according to the present invention.
Figure 6:
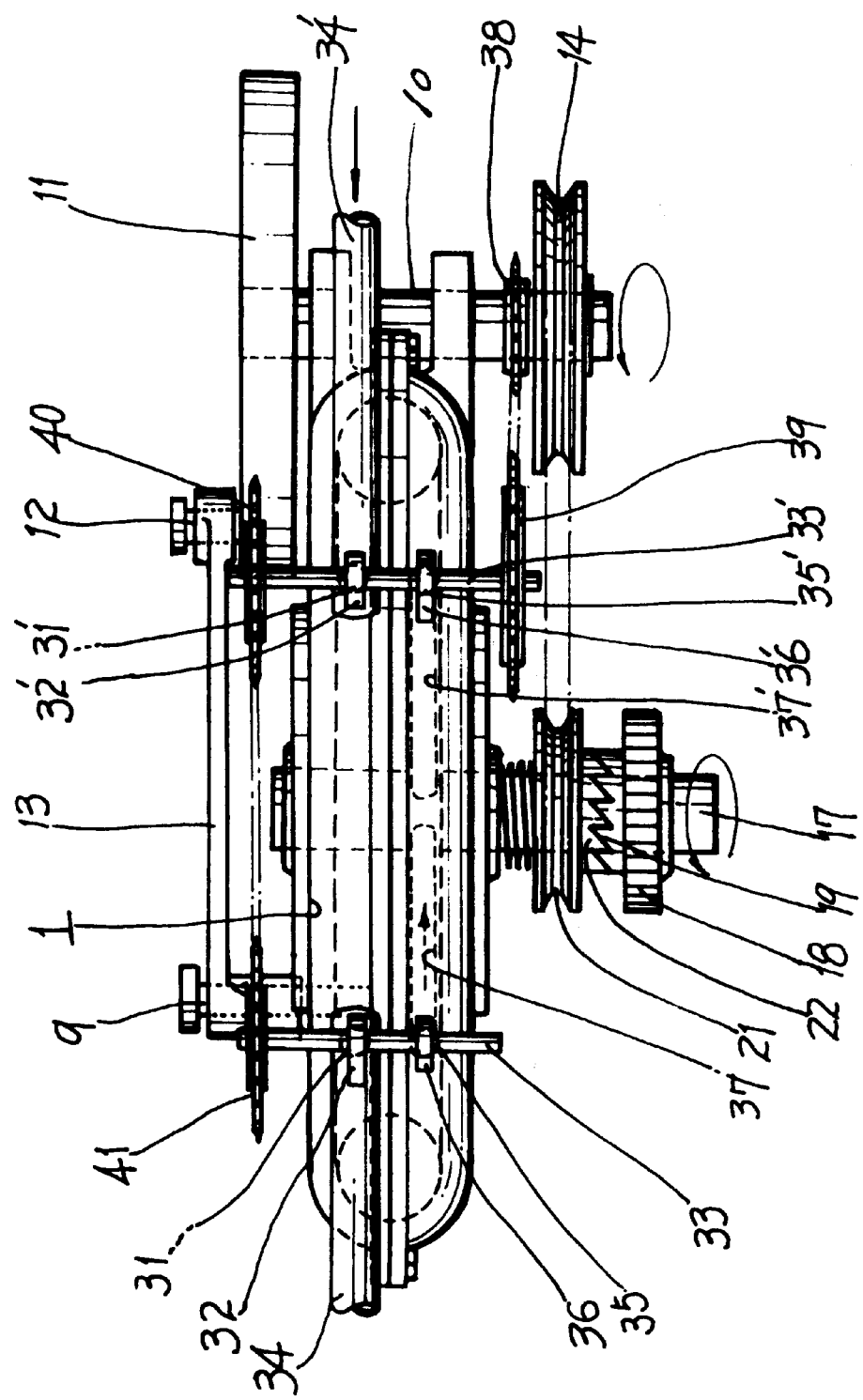
FIG. 6 is a plan view of FIG. 5.

FIG. 5 is a schematic cross-sectional view showing the four-cycle annular cylinder engine according to the present invention, and FIG. 6 is a plan view of FIG. 5. Two gas-combustion chambers are formed between the left and right heads of the arc piston 7. The partition 3 divides the upper part of the annular cylinder, as illustrated. The exhaust passages 37, 37' respectively pass through the top of the chamber to vent against the impeller 26 of the gas turbine 15. The air-fuel mixture intake ports 34, 34' open into the two combustion chambers and are installed in the cylinder 1 block. The exhaust valve 35 and the intake valve 31 are installed in the entrance to the exhaust passage 37 and in the exit to the intake port 34 on the left, respectively. These valves open and close by means of the exhaust cam 36 and the intake cam 32 fixed to the shaft 33 of the timing chain gear 41 (FIG. 6) in which power is conveyed by a chain. The exhaust valve 35' and the intake valve 31' are respectively installed in the exhaust-passage 37' entrance and in the intake-valve 34' exit passing through the gas combustion chamber on the right. These valves open and close by means of the exhaust cam 36' and the intake valve 32' fixed to the shaft 33' of the timing chain gears 39', 40'. Since the diameter of the timing chain gear 39 is twice as large as that of the timing chain gear 38 fixed to the output shaft 10, the four-stroke cycle including intake, compression, power and exhaust is completed per one explosion with two rotations of the output shaft 10.

The intake is the very first stroke of the cycle. In the right-side combustion-chamber the intake valve 31' is open and the exhaust valve 35' is closed. As the right side head of the arc piston 7 moves from the upper dead point down to the lower dead point, the mixture of air and fuel passes through the intake-port 34' and then into the combustion chamber within the cylinder 1. The intake valve 31" closes after the right-side head of the arc piston 7 starts moving upward.

In the following stroke the mixture of air and fuel is compressed. At this moment the cylinder 1 is totally sealed since the exhaust valve 35' is already shut. When the mixture is compressed as the arc-piston 7 head moves up, temperature as well as pressure increases. The mixture is ignited by the ignition plug 24' right before the arc piston 7 reaches the upper dead point. This completes one revolution (360 degrees) of the output shaft 10 with two stroke, or one reciprocation, of the arc piston 7.

Both valves 31', 35' remain shut in the power stroke. Near the beginning of the compression stroke, the mixture is ignited by the ignition plug 24', explodes and increases the pressure within the cylinder 1. This pressure increase results in force being exerted against the arc-piston 7 head. This force is transmitted to the flywheel 11 via the connecting rod 13 which results in rotational output.

The exhaust valve 35' opens (the intake valve remains shut) right before the arc-piston 7 head reaches the lower dead point in the power stroke. As the arc piston 7 starts moving upward the combustion gas is forced through the exhaust passage 37', and against the impeller 26 of the radial gas turbine 15, thereby causing the gas turbine shaft 17 to rotate at high speed. When the arc-piston 7 head reaches the upper dead point the exhaust valve 35 closes, the intake valve 31 opens, and the aforementioned intake stroke restarts. This completes the four strokes, intake, compression, power and exhaust, of the arc piston 7 and the output shaft 10 of the flywheel 11 completes two revolutions (720 degrees).

Therefore, one four-cycle engine in the present invention independently performs four strokes of the arc piston 7 within the annular-cylinder 1 combustion chambers on both sides divided by the partition 3. This corresponds to a two-cylinder function of the conventional four-cycle piston engine. This indicates that many cylinders can be combined and additionally installed as needed if the annular-cylinder side wall of the present invention is plane-treated.

When utilizing the present invention, a generator can be connected to the gas turbine shaft 17 or to the output shaft 10. Electric energy from the generator is used to electrolyze water to produce hydrogen (H2), which passes through to a saving tank. If a small amount of this hydrogen fuel is pump-injected and ignited with the liquid fuel for fuel injection or the compressed mixture at the step where the arc piston 7 within the annular cylinder 1 reaches the upper dead point, then ignition is facilitated, output power increases, and the combustion of harmful substances such as carbon monoxide and hydrocarbons is enhanced. This results in a fuel-saving, pollution-free engine.

Another example of using the engine of the present invention is the following: a venturi unit 50 is formed in the exhaust pipe 16 shown in FIG. 8, and a second air port 51 connected to outside is installed in the central part of the venturi unit. Then, the increase in the exhaust flow speed around the second air port 51 causes a secondary pressure, and huge amounts of this second air is generated proportional to the amount of exhaust, resulting in re-combustion of harmful substances such as carbon monoxide and hydrocarbons in the high-temperature exhaust.

Charging electric energy generated in this manner in a battery and driving the automobile with the motor only eliminates decelerator and clutch, and energy efficiency of the entire automobile is increased. If the flywheel with a ring gear attached is rotated using a conventional starting motor when driving the engine of the present invention for the first time, then the fixing pin 9 related to the connecting rod 13 and the arc piston 7 slides along the guide port 8 prepared on the side wall of the cylinder 1 and arc path reciprocating motion is repeated, which facilitates starting.

The turbo combined annular cylinder engine as described above has small volume and weight per horsepower, has excellent performance, has low engine height, has little exhaust energy loss, and substantially reduces discharge of harmful substances by perfect combustion.

Figure 9:
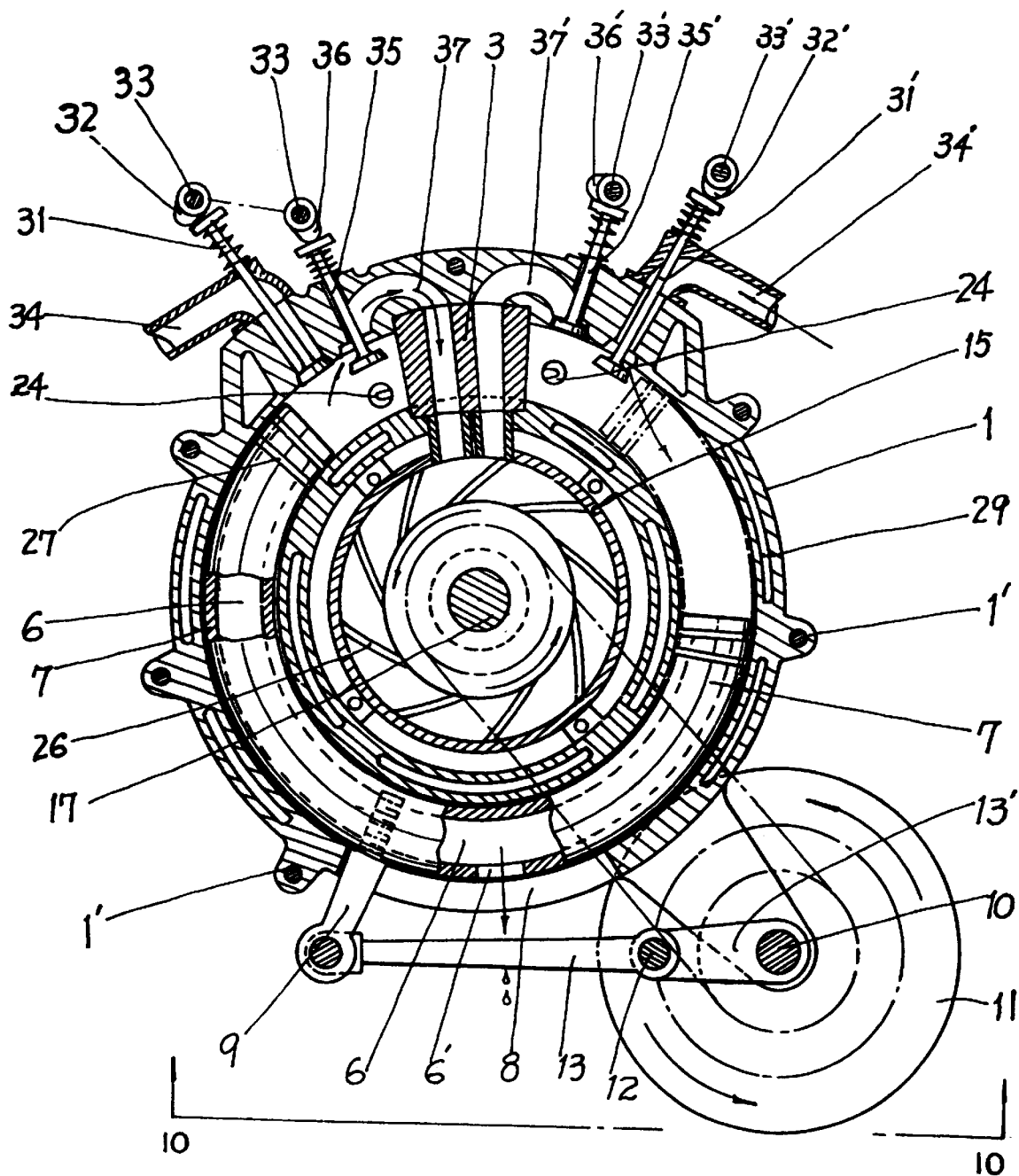
FIG. 9 is a cross-sectional view of multi-cylinder engine showing another application example of the present invention.
Figure 10:
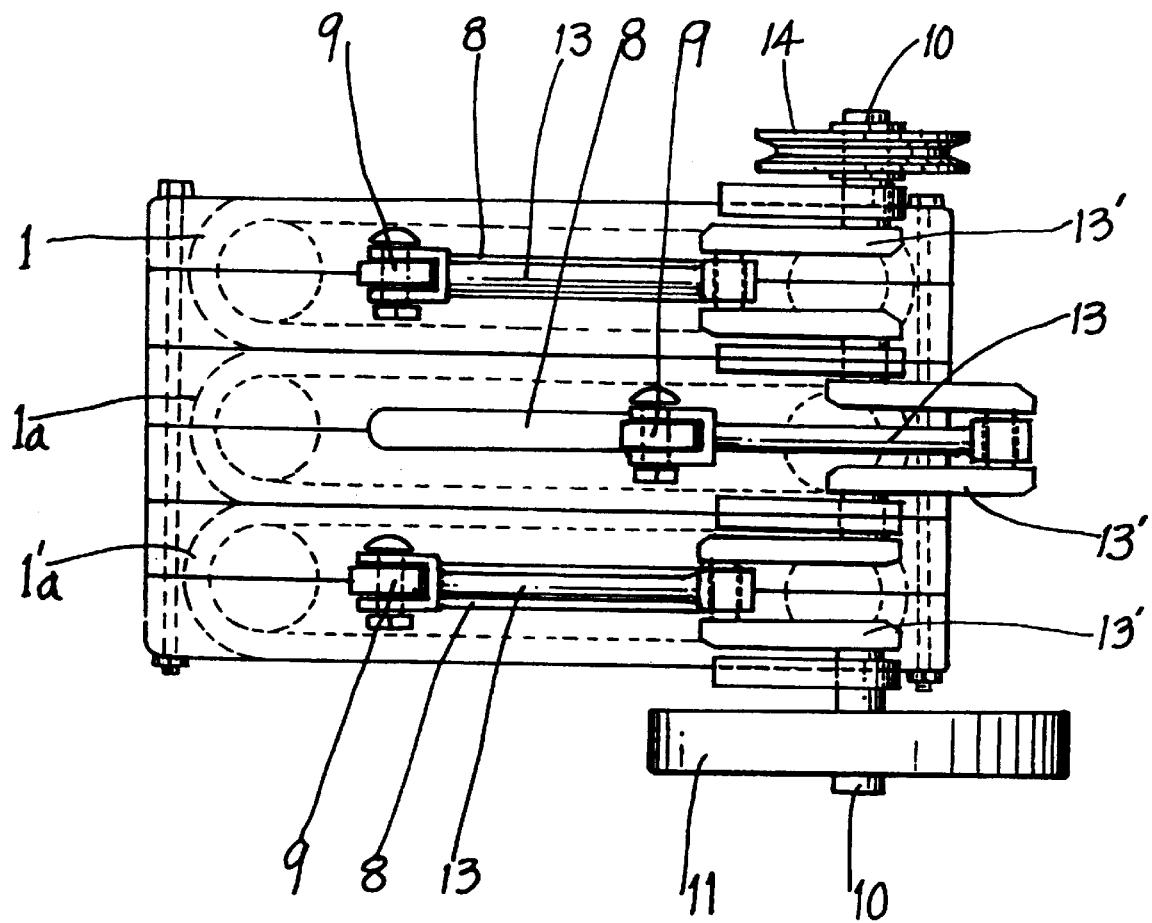
FIG. 10 is a plan view of the engine seen from line V—V of FIG. 9.

FIG. 9 and FIG. 10 show an application example of multi-cylinder engine of the present invention. The fixing pin 9 fixed to the arc piston 7 through the guide port 8 of each annular cylinder 1, 1a, 1a' that is combined in a parallel manner is connected to the connecting rod 13 of the usual crank 13' pin 12 installed in the output shaft 10 of the flywheel 11 Then, when each are piston undergoes out-of-phase curvilinear reciprocating motion within the annular cylinder 1, 1a, 1a', the fixing pin 9 of the arc piston 7 reciprocates along the guide port 8, and at the same time, the connecting rod 13 and crank 13' drive the output shaft 10 to rotate, carrying out the function of the multicylinder.

Figure 11:
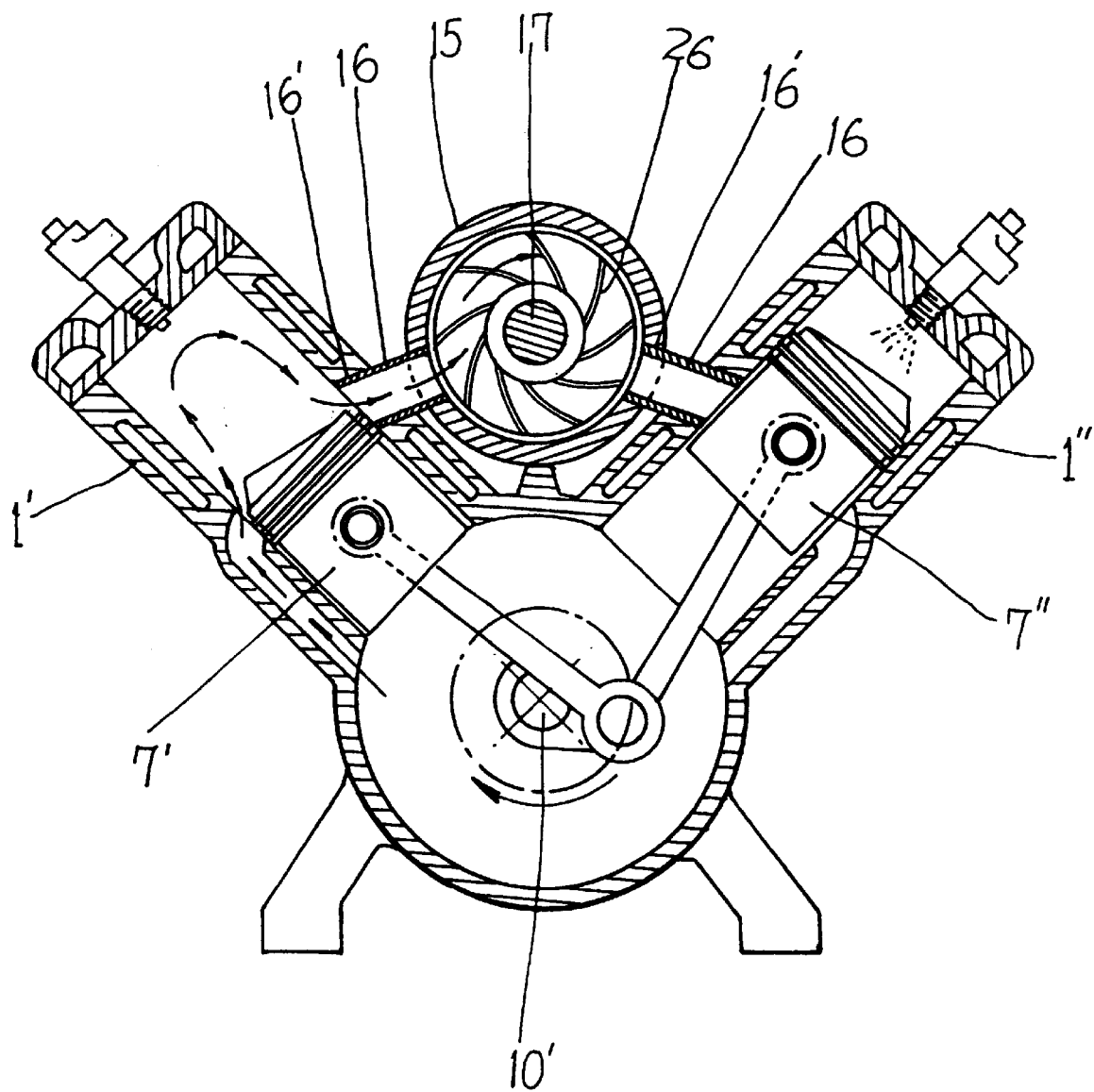
FIG. 11 is a cross-sectional view of another preferred embodiment.

As shown in FIG. 11, in a construction where a gas turbine 15 is installed in the middle upper cavity of a cylinder 1, the gas turbine 15 is not specifically limited and may be built in the direction of an output axis 10' compactly in the center of the concave bottom surface between two cylinders 1' and 1" in a V-shaped cylinder engine which allows the output axis 10' to revolve by the linear reciprocating motion of two piston 7' and 7"

Additionally, short exhaust pipe 16 connected to the impeller 26 in the gas turbine 15 are built in exhaust holes 16' provided in the bottom dead centers of the piston 7' and 7" within the V-shaped cylinders 1' and 1", as shown in FIG. 11, resulting in a high degree of recovery efficiency of the energy from hot exhaust air. These V-shaped cylinders 1' and 1" are readily manufactured by the prior art method and therefore offer an advantage in the curtailment of production costs.

Meanwhile, even if the nearly semi round shape of the cylinder engine as formed by cutting off a part of the cylinder surrounding the gas turbine 15 is replaced by the well-known V-shaped cylinder 1' and 1" engine as shown in FIG. 11, the V-shape is almost the same as the semi round shape. Therefore, the embodiment's volume and weight is so small as to enable its compact installation. A customary super charger can also be associated with the one end side of the axis 17 of the exhaust gas turbine 15 of FIG. 11 as describe above. While the engine axis 10' of the V-shaped cylinders 1' and 1" engine is in parallel with the axis 17 of the gas turbine 15, the said engine and the said gas turbine generate the respective output as different in velocity. However, it is possible to have a mechanism(device) for combining two different outputs generated concurrently from the said engine and gas turbine embodied as shown in said FIGS. 1, 6 and 7. The effect of this mechanism's action is the same as that of said embodiment.

Although this invention has been described in its preferred form with a certain degree of particularity, it is to be appreciated by those skilled in the art that the present disclosure of the preferred form has been made only by way of example and that numerous changes in the details of the construction, combination and arrangement of parts may be made without departing from the spirit and scope of the invention.

What is claimed is:

1. A two cycle engine, comprising:

an engine block having an annular cylinder formed about an arc-piston reciprocally positioned in said annular cylinder;

a partition secured within said annular cylinder separating said annular cylinder into an air intake compression chamber and a gas combustion chamber such that in use upon reciprocation of said arc-piston one of said chambers is expanding while the remaining of said chambers is contracting;

a scavenging port (2), including a valve (2'), formed in said partition for controlling, in use, compressed air flow into said gas combustion chamber from said air intake compression chamber;

an exhaust port formed in said gas combustion chamber for venting, in use, exhaust gases;

an air intake port including a valve (25) formed in said air intake compression chamber proximate said partition for providing air into said air intake compression chamber;

a fuel injector (23) positioned in said gas combustion chamber;

a spark plug (24) positioned in said gas combustion chamber;

a fixing pin (9) operatively secured to said arc-piston and extending through an arcuate opening (8) formed in said annular cylinder;

a connecting rod (13) having a first end (13A) and a second end (13B) with said first end (13A) rotatably secured to said fixing pin (9); and a flywheel (11) rotatably secured to an output shaft, with said second end of said connecting rod operatively connected to said flywheel such that in use upon firing said spark plug, a fuel-air mixture in said gas combustion chamber is ignited, rapidly forming expanding combustion products forcing said arc-piston positioned in said annular cylinder to slidably and forcibly move in said annular cylinder thereby compressing air in said air intake compression chamber causing said valve of said scavenging port to open and said compressed air to flow into said gas combustion chamber and upon further arc-piston travel within said annular cylinder exposing said exhaust port thereby permitting said expanding combustion products to vent through said exposed exhaust port together with a portion of said compressed air flowing into said gas combustion chamber thereby forcing out said combustion products through said open exhaust port and forcing said fixing pin to cause said connection rod to rotate said flywheel thereby rotating said output shaft and upon further rotation of said flywheel said annular cylinder thereby compressing said air mixture in said gas compression cylinder and drawing in air into said air intake compression chamber through said air intake valve (25) in preparation for fuel injection and ignition.

2. The engine of claim 1 wherein said opening includes a radial gas turbine secured therein and comprising an impeller rotatably mounted on a gas turbine shaft (17) with said gas turbine shaft being perpendicular to the plane of said annular cylinder and with said exhaust passage operatively positioned such that in use said exhaust gases flowing from said exhaust valve cause said impeller and said gas turbine shaft to rotate;

said output shaft (10) and said gas turbine shaft each further including a pulley (14), (21), respectively, rotatably connected to each other such that in use rotation of said pulley (14) and said pulley (17) are combined to provide a total gas turbine shaft rotation; and a clutch means operatively positioned on said gas turbine shaft for optionally engaging said rotation of said total gas turbine shaft rotation to a power transmission.

3. The engine of claim 1, further comprising a venturi unit formed in the exhaust pipe and a second air port installed in the central part of said venturi unit.

4. The engine of claim 1, wherein said annular cylinder is formed in a near U shape for enhanced cooling of the arc-piston and the bottom portion of said near U shaped cylinder is open.

* * * * *